March 11, 1969  J. B. JONES, JR  3,432,348
FLUID DISTRIBUTOR FOR VERTICAL VESSELS
Filed Nov. 28, 1966  Sheet 1 of 5

INVENTOR.
JOHN B. JONES Jr.
BY
ATTORNEY

INVENTOR.
JOHN B. JONES Jr.
ATTORNEY

March 11, 1969  J. B. JONES, JR  3,432,348
FLUID DISTRIBUTOR FOR VERTICAL VESSELS
Filed Nov. 28, 1966  Sheet 3 of 3

INVENTOR.
JOHN B. JONES Jr.
BY
Richard D. Law
ATTORNEY

United States Patent Office 3,432,348
Patented Mar. 11, 1969

---

3,432,348
FLUID DISTRIBUTOR FOR VERTICAL VESSELS
John B. Jones, Jr., Denver, Colo., assignor, by mesne assignments, to The Battelle Development Corporation, Columbus, Ohio, a corporation of Delaware
Filed Nov. 28, 1966, Ser. No. 597,299
U.S. Cl. 134—42           11 Claims
Int. Cl. B08b 3/04

This invention relates to vertical treatment vessels having material to be treated moving in a bed downwardly through the vessel in a gravity flow and with a treatment fluid injected into various portions of the downwardly moving bed of material for contacting the same, and particularly to vessels and means for uniformly contacting the entire bed of the downwardly moving material with the fluid injected therein.

In a number of processing operations, it is desirable to provide a uniform contacting between two or more reactants in a vessel in order to control the resulting reaction to adequately produce a specific product. Many reactions require a substantial period of time of contact between the reactants to produce the specific product of the treatment. Thus, in a vessel, the material to be treated must have a sufficient residence time to be contacted with the other reactants for the length of time necessary to complete the desired reaction. In many processes a particulate solid is reacted with a fluid, at either high or low temperatures, and certain types of upright vessels containing the reactants for reactions at elevated temperatures are called shaft kilns, vertical kilns, or the like. In such vessels, a bed of the particulate material is passed slowly from a feeder at the top to a lower discharge opening, maintaining a constant depth of the bed. Treatment fluids are sometimes injected at various heights into the bed for contacting the particulate material for producing the reaction. For certain types of processes, particulate material is slowly fed at ambient temperatures, treated with gases, for example with gases of combustion at a relatively high temperature, partially cooled, and the resultant solid products discharge from the bottom of the kiln and gaseous products discharged from the top. In other processes, the reaction fluid products (gases and/or liquids) may leave the kiln at either the top or with the solids at the kiln bottom.

In many such processes crushed rock of a variety of sizes is fed into the top of the kiln and treated with the hot gases of combustion to effect a change in the rock. The desired reactions in other processes may take place at either low or high temperatures and do not have to be the result of or treatment by combustion gases. Some processes include a combustion of a fuel in the bed of rock, for example calcining limestone to lime. As the particulate material moves through the kiln, starting from the feed into the kiln, a certain amount of segregation occurs, preventing a fully uniform distribution of particles laterally of the kiln. When segregation occurs, of course, larger sizes predominate in a portion of the kiln and smaller sizes predominate in other portions. Larger sizes pemit an easier fluid flow or through-put because of voids between the larger sizes, and, conversely, a predominance of smaller sizes reduces fluid flow through the mass of particles. Such segregation, therefore, generally results in channeling and uneven flow of the fluids throughout the solids in the kiln. Where time of contact of the fluid with a particulate material is essentially critical, such non-uniform flow of the fluid due to the channeling, etc., may not provide sufficient time to completely treat the particles, leaving untreated the cores in the larger particles. On the other hand, smaller particles may be in contact with the fluid too long and excess reaction, and in certain types of processes, overburning occurs. In some instances segregation results in a higher percentage of larger particles adjacent the wall of the kiln, permitting a faster flow of the fluid through the voids along the wall, resulting in unequal treatment of the particles in the kiln.

The problem of producing equal contact time for all the particles in the kiln has been perplexing and has actually inhibited the growth of vertical kilns. The prior art workers have failed to produce a unit having uniform horizontal distribution of the treatment fluid in the moving bed which, also, produces a uniform flow of the fluid vertically through the bed. Treatment fluids have been introduced into the bed at different elevations by different workers and by using different means. To provide for a uniform flow of the particulate material through the kiln, a series of side by side distribution pipes have been tried, but the number of lateral distribution pipes for the fluid which may be used, that is, those extending completely through the kiln, is limited, since too many such pipes disrupt the flow of the particulate material. Furthermore, at increased temperatures, particularly where there is combustion of a fuel in the bed for the treatment of the particulate material, the fluid distributors extending through the bed must be of a heat-resistant material, and are of considerably larger cross-sectional dimensions than ordinary pipes. Normally, combustion occurs at temperatures well above the resistance of conventional materials of construction, for example steel; therefore, ceramic or refractory material are used. In other instances, jacketed steel pipes with circulating coolant have been used to prevent deterioration of the fluid distributors. In both cases, however, the bulk of the fluid distributor prevents the use of very many such distributors to provide for a uniform horizontal distribution of the fluid into the moving bed.

In one prior art device for calcining limestone, the inventors provide a pair of distributors at several elevations in a kiln. Each distributor, however, includes a series of pipes, each one of which terminates in several outlets in the kiln, and each of the series of pipes is individually controlled. The express purpose of the arrangement is to provide a uniform distribution of fuel along the length of distributor in the kiln. This arrangement is indicated as having application only for a very small cross-section and very high kiln, on the order of 11 square foot by 50 foot high kiln.

It is, therefore, an object of the invention to provide apparatus arranged to inject a substantially uniform amount of fluid into a material bed, in a vertical vessel, per unit of cross-sectional area so as to uniformly contact the material passing through the vessel with said fluid.

Another object of the invention is to provide a uniform introduction of fluids into the bed of material in a vertical vessel using a minimum number of distribution channels for the fluid.

A further object of the invention is to provide for uniform introduction of combustible fluids into a bed of granular material in a vertical kiln so that combustion occurs essentially uniformly throughout the lateral cross-sectional extent of the bed.

Another object of the invention is to provide for uniform introduction of fluids into vessels where the ambient temperature internally of the vessel is above the maximum operating temperature for the materials used in the construction of the distribution channel or channels for introduction of the fluid into the vessel.

A still further object of the invention is to provide a controlled system for the uniform and simultaneous distribution and introduction of gaseous and/or liquid fluids into vessels containing a moving bed of broken or particulate solids and/or fluids.

Further objects and advantages of the invention may be readily ascertained by referring to the following description and appended illustrations in which.

Figure 1:
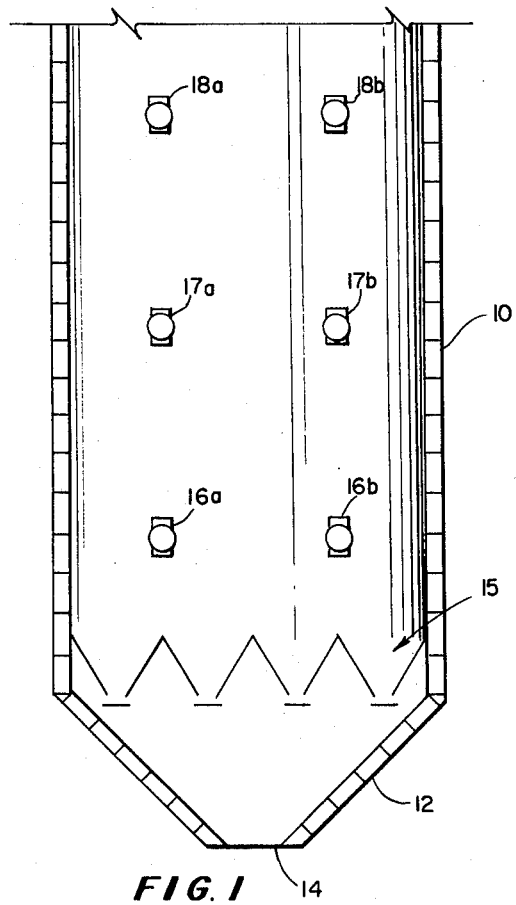
FIG. 1 is a cross-sectional view, partially schematic, of a vertical kiln, illustrating positioning of fluid distributors therein and showing a grate structure for the discharge of solid material from such a kiln.
Figure 3:
FIG. 3 is a side elevational view of a distributor according to the invention.
Figure 4:
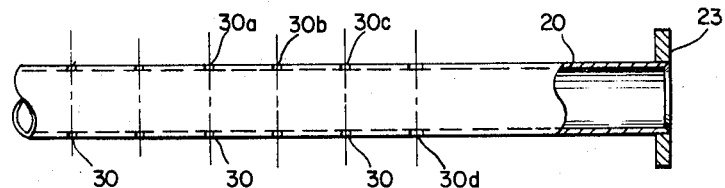
FIG. 4 is a top view, partly in section, of a distributor pipe according to the invention, illustrating the distribution of the ports therein.

In the drawings, FIG. 1 illustrates one form of kiln with fluid distributors mounted therein in one preferred configuration for certain types of high temperature treatment of rock, for example, calcining limestone at a temperature of from 950° to 1300° C. to make lime. The kiln includes a tubular wall 10 of refractory and a cone-shaped outlet 12 secured thereto, providing a lower outlet 14 for the release of material which passes a grate, shown in general by numeral 15, one form of which is shown and described in my copending application Ser. No. 589,091, filed Oct. 24, 1966, for "Linear Grate for Shaft Kilns." The height and diameter of the kiln is determined in general by the type of material being treated, and the required through-put normally based on a ton day per unit of cross-section. Two distributors 16a and 16b are mounted in the lower part of the kiln, spaced thereabove are two similar distributors 17a and 17b, and two additional distributors 18a and 18b are mounted thereabove. It is noted that the distributors are mounted one above the other in a vertical line for the purposes set forth below. The distributors are arranged to introduce fluid into the kiln under conditions to provide essentially uniform distribution across the lateral extent of the kiln at the distributors and thereby provide a uniform distribution of the fluid into the entire cross-section of the mass of material and vertically of the kiln.

The particular distributors for the kiln of FIG. 1 are shown in FIGS. 3 through 6, inclusively, and they provide an inner fluid distributor conduit 20 having secured thereon an upper jacket 21 and a lower jacket 22. The jackets are attached so as to leave an exposed portion of conduit 20 on each side. The ends of the conduit 20 are flanged at 23 and 24 for connection to a fluid supply line and/or a cover for blanking off one end, depending upon the particular operation. A mounting ring 25 is mounted adjacent each end of the distributor, providing means for sealing the same in the kiln wall. The upper jacket 21 is a channel-shaped plate welded to the top of the pipe 20 and is provided with an inlet 26 at one end and an outlet 27 at the opposite end for passing coolant fluid therethrough. The channel-shaped plate may be changed in shape to meet the requirements of kiln and process. In a similar manner the jacket 22 on the bottom is provided with an inlet 28 at one end and an outlet 29 at the opposite end for passing coolant fluid therethrough. A plurality of orifices 30 are provided in each side of the gas distributor in the space between the jackets 21 and 22 for introducing fluid into the kiln. The arrangement and size of these orifices determines the distribution of the fluids in the kiln.

Fluids introduced into the kiln are passed through the distributor tube 20 and through the orifices 30 into the interior of the kiln. The geometry of the orifices in relation to the distributor pipe 20 is such that the cross-sectional area of the pipe 20 exceeds the combined cross-sectional area of the orifices 30. In this manner the tube 20 may be supplied with fluid, and the fluid entering each orifice will be under the same static pressure for introducing a predetermined amount of fluid at a particular location. It is important to provide an equal volume of fluid per unit volume of material serviced by each orifice. Since all of the orifices are supplied with fluid from the common manifold or distributor 20, the different rates of fluid injection may be achieved by (1) varying the cross-sectional dimensions of the orifices in relation to the size of the cross-sectional area serviced by the orifice, on a horizontal cross-section of the kiln, or (2) by providing uniform diameter orifices and varying the space between adjacent orifices so as to achieve a uniform amount of fluid per unit volume of material serviced by the particular orifice.

Figure 7:
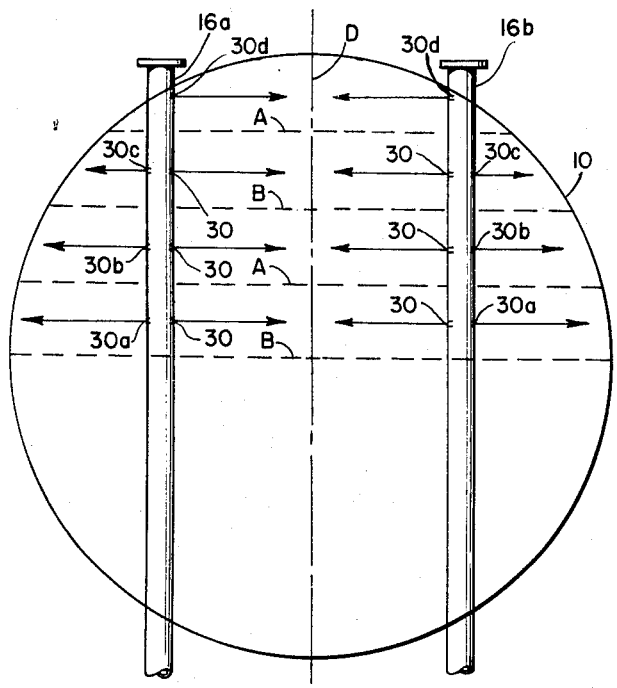
FIG. 7 is a top, schematic plan view of a kiln with two distributors in place, illustrating the distribution of fluid across the lateral extent of the kiln.

In the schematic diagram shown in FIG. 7 for half a kiln, the orifices 30 on the inside of the distributor service equal areas, illustrated as the area bounded by the dashed lines A and B, the diameter D and the wall of the distributor 16a or 16b, as the case may be; assuming each orifice services one-half the area from distributor to distributor. On the opposite side, or the outside of each distributor, the orifices 30a, 30b, 30c (FIG. 7) service each inner orifice service a slightly different area, due to the curvature of the wall, and, therefore, the size of the orifices 30a, 30b, 30c must be varied to provide for the different areas being serviced. The area serviced by orifice 30a is slightly smaller than the area serviced by the orifice 30 on the inside or opposite side of the distributor, and the area serviced by orifice 30b is smaller than the area serviced by the orifice 30 on the opposite side, etc. On the inside of the distributor, an orifice 30d nearest the wall services a different size of area and, therefore, it should be of a different size than the orifices 30. The area serviced by the orifice 30d is bounded by a portion of the arcuate wall 10, the diameter D, dashed line A and the wall of the distributor 16a or 16b, as the case may be. As pointed out above, the cross-sectional area of the distributor tube 20 is larger than the combined areas of the orifices in the tube so that the fluid issuing from each orifice is under the same pressure, and the orifice size determines the amounts of fluid injected into that area of the kiln.

If the material comprising the bed in the kiln is of uniform particulate size, and if there is no "wall effect," whereby material adjacent the wall is frictionally retarded during vertical descent of the bed, then based upon the area serviced only, the size of the orifice 30a would be slightly less than its opposed orifice 30 and slightly greater than orifice 30b and slightly greater than orifice 30c. However, not all material comprising the bed of the kiln 10 may be of uniform particulate size, and segregation of particles according to size, "wall effect" and reflection of heat from the refractory of the wall back into the bed may be present. Each of these factors affects the determination of the sizes of the orifices 30a, 30b, 30c, 30d, as well as the difference in size of area serviced by each orifice.

In those instances where segregation of particulate material occurs to produce predominantly larger particles adjacent the wall, the orifices 30a, 30b, 30c introducing fluid toward the wall, are made slightly larger to compensate for "wall effect" or resistance to uniform downward material movement at the wall 10. In a lime kiln, for example, where the bed, by segregation, has on an average a greater percentage of larger particles adjacent the wall, normally more heat is required along the wall for the uniform calcining of the limestone. The orifices 30a, 30b, 30c, 30d directly adjacent the wall should, therefore, be made slightly larger than calculated for a uniform size material. In those instances where segregation causes smaller particles adjacent to the wall, the orifices will be correspondingly smaller than that calculated in relation to the area served. Also, as pointed out above, by varying the distance between the orifices, of the same or different diameters, the distribution of the fluid into the bed may be conducted so as to compensate for any variance of area, variance due to segregation, variance due to wall effect, etc. The bed of particulate material in kilns for incremental units of time is substantially static, and calculations are made on that basis. A shield may be necessary to prevent blocking the orifices, in which case a small shield built into the top cooling channel above each orifice will protect it from rock becoming temporarily lodged against the orifice and disrupting movement of fluid therethrough.

The distributor described in FIGS. 3-6 is arranged for introducing a premixed mixture of fluids for reactions within the kiln. Where one of the reactions is combustion, the amount of oxygen in the mixture may be controlled to provide a controlled burning at various levels in the kiln. For example, introducing a fuel-rich mixture from distributor 16a produces only partial combustion of the fuel in the kiln at the level of that distributor. Introducing an oxygen-rich mixture into distributor 17a provides oxygen for combustion of the unburned fuel rising from distributor 16a as well as fuel in the mixture from distributor 17a, and by providing a highly enriched oxygen mixture from distributor 18a completes the combustion of all the fuel from the distributors in each vertical line. The effect produced by burning such mixtures of fuel and oxygen or air, on each side of the kiln, is an elongated flame similar to producing an elongated Bunsen burner flame in the kiln. The lateral distribution of the fluid, either liquid or gas, is controlled by the orifice configuration of the distributor to produce uniform reactions, both horizontally and vertically of the kiln.

Figure 2:
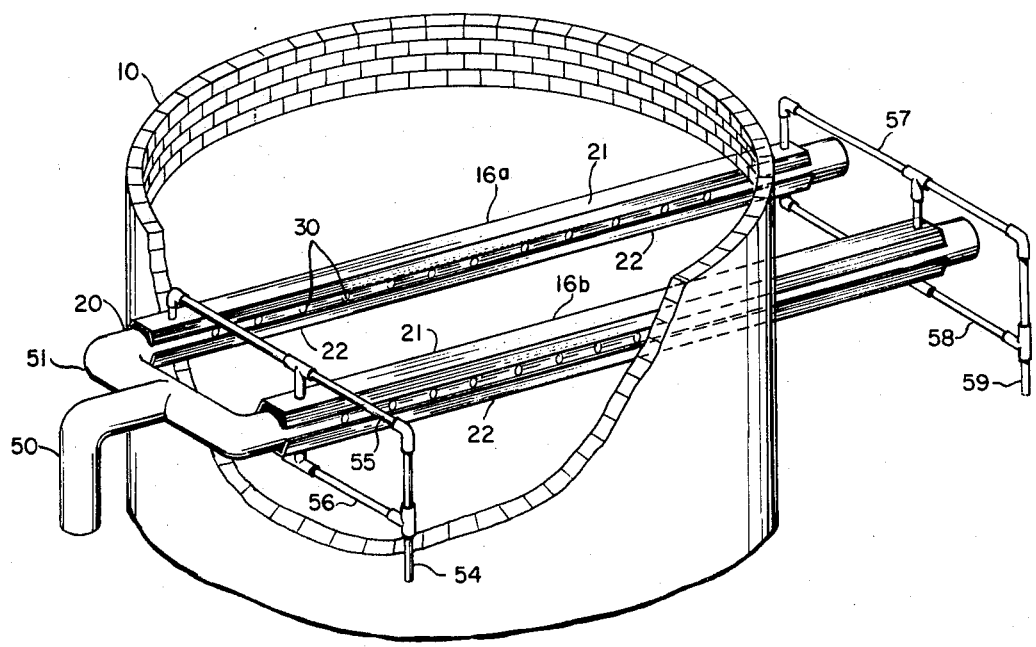
FIG. 2 is an enlarged detailed view of a portion of a kiln, illustrating the positioning of two fluid distribution channels and the method of feeding the same.

A general arrangement of the distributors is shown in FIG. 2 wherein the distributors 16a and 16b are mounted in a kiln 10 with a common supply conduit 50 connecting through a manifold 51 to the two distributor conduits. In this case, the ends of the two distributors opposite the manifold 50 are blanked off. The jackets are serviced with coolant from a supply line 54 at one end going through inlet headers 55 and 56 to the jackets 21 and 22. The coolant is withdrawn from the jackets by an outlet header 57 on top and an outlet header 58 on the bottom of the opposite ends of the distributors connected to a return line 59. As pointed out above, a sufficient amount of mixed fluid is injected into each of the distributor conduits 20 so that a uniform static pressure is exerted on each of the orifices in each distributor conduit 20. In this manner the distributor acts somewhat as an accumulator to provide a uniform pressure for all of the orifices.

Figure 9:
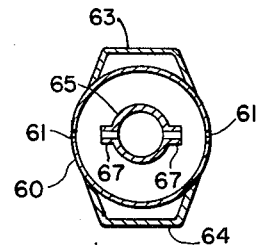
FIG. 9 is a typical cross-sectional view of another embodiment of a distributor.
Figure 5:
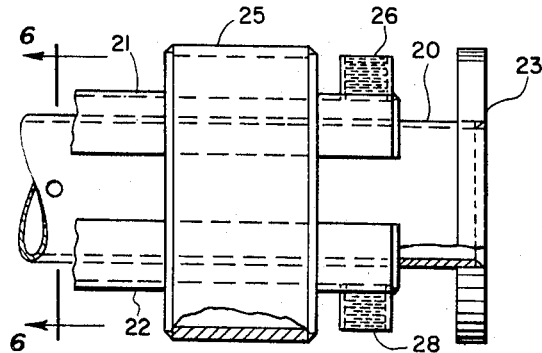
FIG. 5 is an enlarged, detailed, side elevational view of an end of the distributor.
Figure 6:
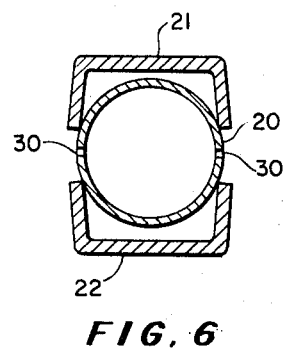
FIG. 6 is a cross-sectional view of the distributor, taken along section line 6—6 of FIG. 5.

In certain instances it may be desirable to inject a gaseous fluid along with a liquid fluid through the distributor conduits. As illustrated in FIG. 9, a distributor tube 60 provided with a plurality of orifices 61 on each side has mounted thereon an upper jacket 63 and a lower jacket 64, similar to the configuration of FIG. 6. A central manifold 65 has a plurality of jet outlets 67 on each side each directed toward an orifice 61 in the distributor tube 60. This provides means for injecting both a liquid fluid from the central manifold 65 and a gas from the distributor tube 60 into the bed. The stream of liquid and the pressurized gas pass through the orifices 61 into the bed, being thoroughly mixed for distribution into the bed, and for certain processes for burning or treating the material in the kiln. For uniform flow of liquid through the orifices, the cross-sectional area of the manifold 65 is larger than the combined cross-sectional areas of the jet orifices 67 therethrough so that liquid is distributed through each of the orifices at the same velocity and under the same pressure. Mixing of the liquid and gas is accomplished as both fluids pass through the orifices 61 and in the bed itself.

Figure 8:
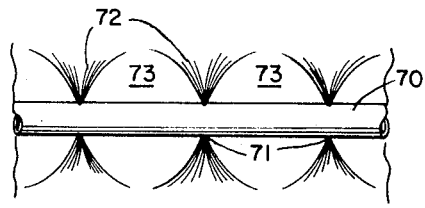
FIG. 8 is a schematic view of a distributor illustrating an idealized configuration of the distribution of fluid from a distributor into a bed of material in a vertical vessel.

FIG. 8 illustrates an idealized arrangement of a fluid distributor 70 having therein a plurality of opposed orifices 71 from which fluid is shown emerging in idealized spray patterns 72. It should be noted that between adjacent spray patterns 72 there are areas 73 adjacent the outer wall of the distributor 70, that are essentially clear of the fluid spray pattern 72. It is believed that the fuel mixtures emitting from the orifices 30 and 61 in the distributor conduits 20 and 60, also form patterns that are similar to the patterns shown in FIG. 8.

The present invention is highly effective in producing uniform distribution of fluids per unit of volume of the material throughout the horizontal and vertical extent of shaft vessels as large as 30 or 40 feet in diameter or larger. The uniform contact permits a substantial reduction in overall height, and particularly the excellent control of the distribution of the fluid produces effective control of the contact time of the fluid with the material to be treated. The disclosure shows a two distributor per level vessel; however, as the diameter of the vessel increases, additional distributors need to be added at each level to provide sufficient fluid for the treatment. For smaller vessels only one distributor may be needed. Each additional distributor added to a vessel requires that the size and spacing of the orifices be calculated from the area (volume of material) serviced by the orifice.

The control of fluid distribution horizontally at each distributor level in the vessel gives better control of fluid distribution vertically of the vessel. The volume around each distributor level may be considered a zone in the vertical extent of the vessel, and by controlling the pressure of injection of fluid from the distributors into the various levels, the pressure of various zones may be controlled in the vessel, further aiding the uniform distribution of the fluids throughout the vessel. For example, by injecting fluid from the distributors at one level at a higher pressure, producing a higher pressure zone than a lower one, will reduce channeling from the lower contiguous zone which is at a lower pressure, actually causing a more uniform horizontal distribution of the fluid rising from the lower zone. The higher pressure tends to impede the upward flow of fluid from a lower zone, in which the fluid pressure is lower, thereby causing the fluid at the lower pressure to spread horizontally and be more uniformly distributed in the lower pressure zone, where the total movement of fluid is upwardly in the vessel. Thus, control is achieved in another manner. This, also, provides a control of the reaction, since more or less fluid may be injected into a zone as determined by the requirement of the reaction in the particular zone in the vessel.

While the invention has been described by reference to particular embodiments, there is no intent to limit the spirit or scope of the invention to the precise details so set forth except as defined in the following claims.

I claim:
1. The method of introducing fluids under pressure into material to be treated residing in shaft vessels comprising:
   (a) passing a confined supply of fluid under pressure into a plurality of zones in a shaft vessel, each confined supply extending from wall to wall of said vessel generally along a horizontal plane;
   (b) introducing fluid into the material in said vessel at selected points from orifices along said confined supply, and the amount of fluid introduced from every such point being sufficient to provide a uniform amount of fluid in relation to each unit of volume of material in a predetermined space horizontally about each point to thereby provide a uniform amount of fluid per unit-volume of material in a horizontal zone about said confined supply, said predetermined spaces extending along the entire extent of said confined supply internally of said vessel and arranged in abutting position from wall to wall of said vessel;

(c) and supplying said orifices with sufficient fluid to maintain the same pressure on the fluid entering each orifice.

2. The method of claim 1 wherein the introduction of fluid into the material is from uniformly spaced orifices along each side of each supply and the cross-sectional area of each orifice is varied to compensate for the size of said predetermined space about each orifice.

3. The method of claim 1 wherein the introduction of fluid into the material is from orifices of a uniform size, and such orifices are formed at variable spacing in said supply so as to vary the volume of material about each orifice and thereby compensate for the uniform amount of fluid from each orifice and provide a uniform amount of fluid per unit-volume of material about said orifice.

4. The method of claim 1 wherein a portion of said fluid is liquid and a proportion is a gas.

5. A fluid distribution system for shaft vessels comprising a plurality of fluid distributors spacedly mounted in a series of vertically spaced horizontal zones in a shaft vessel, each said distributor extending from wall to wall internally of said vessel and providing a confined supply of fluid therein; means for supplying fluid under pressure to each said distributor, there being a plurality of orifices along each said distributor, each said orifice being arranged to direct fluid horizontally into said vessel, and said plurality of orifices arranged to provide one series of orifices along one side of said distributor and an opposed series of orifices along the opposite side thereof, the combined cross-sectional area of all of the orifices in each said distributor being substantially less than the cross-sectional area of said distributor so as to introduce fluid into all of said orifices at substantially the same static pressure, said orifices being arranged to issue an amount of fluid therefrom sufficient to provide a uniform amount of fluid in relation to each unit of volume in a predetermined space horizontally about each orifice, said predetermined spaces extending along the full length of said distributor internally of said vessel and said spaces being in abutting relation; and there being a sufficient number of distributors to provide a uniform amount of fluid per unit of volume of material throughout each said horizontal zone.

6. A fluid distributor system according to claim 5 wherein at least one such distributor is mounted on each horizontal plane.

7. A fluid distributor system according to claim 5 wherein at least two such distributors are mounted on each horizontal plane and a substantially equal quantity of fluid is supplied to each such distributor in each horizontal plane.

8. A fluid distributor system according to claim 5 wherein said orifices are uniformly spaced along each side of each distributor, and the cross-sectional area of each orifice is varied to compensate for the change in size of each predetermined space about such orifice.

9. A fluid distributor system according to claim 5 wherein said orifices are of uniform size and issue a uniform amount of fluid and are spaced at varying distances apart across said distributor so as to change the size of each predetermined space about each orifice to provide a uniform amount of fluid per unit of volume about each orifice.

10. A fluid distribution system according to claim 5 wherein each distributor is a pipe in a pipe, the outer said pipe being a supply for gas with an effective cross-section substantially larger than the combined cross-sectional areas of the orifices formed therein, said inner pipe being a liquid supply; a series of orifices in said inner pipe spaced from and in register with each said orifice in said outer pipe for issuing liquid through each said orifice in said outer pipe along with gas, the combined cross-sectional area of said liquid orifices being substantially less than the cross-sectional area of said inner pipe.

11. A fluid distributor system according to claim 5 whreein each said distributor is a circular conduit with an upper and a lower coolant packet mounted thereon, with a space therebetween exposing said conduit and defining an area for said orifices along opposed sides of said conduit.

References Cited

UNITED STATES PATENTS

| | | | |
|---|---|---|---|
| 2,860,955 | 11/1958 | Kassel | 134—25 XR |
| 2,978,300 | 4/1961 | McCowen et al. | 23—271 XR |
| 3,156,292 | 11/1964 | Ross | 239—561 XR |
| 3,355,158 | 4/1966 | Campbell et al. | 263—29 |

MORRIS O. WOLK, *Primary Examiner.*

J. D. OLSEN, *Assistant Examiner.*

U.S. Cl. X.R.

263—52, 27; 431—174; 239—561; 266—29; 23—277, 252, 1